United States Patent Office 3,787,572
Patented Jan. 22, 1974

3,787,572
N-DISUBSTITUTED 3-AMINO-1,2-BENZISOTHI-AZOLES AS ANTIMYCOTIC AGENTS
Horst Böshagen, Haan, Rhineland, Germany, assignor to Farbenfabriken Bayer Aktiengesellschaft, Leverkusen, Germany
No Drawing. Original application June 26, 1968, Ser. No. 740,020, now abandoned. Divided and this application Sept. 29, 1971, Ser. No. 182,246
Claims priority, application Germany, Mar. 9, 1968, F 53,242
Int. Cl. A61k 27/00
U.S. Cl. 424—244                                15 Claims

ABSTRACT OF THE DISCLOSURE

Compounds and their production are provided wherein the compounds have anti-fungal activity against pathogenic fungi in animals and humans. The compounds are N-disubstituted 3-amino-1,2-benzisothiazoles of the formula:

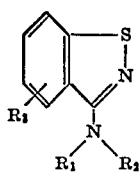

in which $R_1$ and $R_2$ are each individually aryl, aralkyl or an aliphatic radical, and when each of $R_1$ and $R_2$ is alkyl, the two aliphatic radicals together are linked to form a heterocycle with a nitrogen heteroatom, and
$R_3$ is at least one hydrogen or halogen atom or a lower alkyl or alkoxy group, or nitro.

More generally, the compounds are made up into antimycotic compositions with a suitable carrier or vehicle.

CROSS-REFERENCE

This is a division of application Ser. No. 740,020, filed June 26, 1968, now abandoned.

DETAILED DESCRIPTION

N-monosubstituted 3-amino-1,2-benzisothiazoles have been obtained according to the process of German published patent specification No. 1,174,783 by reacting 3-chloro-1,2-benzisothiazole with primary, basically alkylated amines. This process, however, has the disadvantage that it is limited to the use of certain high-boiling amines. N-monosubstituted 3-amino-1,2-benzisothiazoles could also be prepared by reacting N-alkyl- or N-aryl-3-chloro-1,2-benzisothiazolium halides with ammonia (H. Böshagen, Chem. Ber. 99, 2566 (1966)).

It has now been found in accordance with the present invention that novel N-disubstituted 3-amino-1,2-benzisothiazoles are obtained by reacting an amine of the formula:

in which $R_1$ and $R_2$ each represents an aryl, aralkyl or an aliphatic radical, and when each of $R_1$ and $R_2$ represents an alkyl radical, the two aliphatic radicals may be linked to form a heterocycle via a nitrogen atom, with a 3-chloro-1,2-benzisothiazolium salt of the formula:

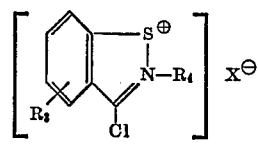

in which $R_3$ stands for one or more hydrogen or halogen atoms or alkyl groups (of 1 to 4 carbon atoms), alkoxy groups (of 1 to 4 carbon atoms), or a nitro group,
$R_4$ represents an aliphatic, araliphatic, or aryl radical, and
X stands for the anion of a strong inorganic acid, and splitting the intermediately formed benzisothiazolium salts in an inert solvent at a temperature between 120° and 190° C.

The novel compounds are N-disubstituted 3-amino-1,2-benzisothiazoles of the formula:

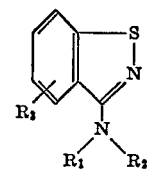

in which $R_1$, $R_2$ and $R_3$ have the same meaning as above.

By aromatic radicals ($R_1$, $R_2$) there are to be understood aromatic radicals having up to 10 carbon atoms in the ring system, preferably the phenyl radical, the aromatic radical being optionally substituted by lower alkyl and/or alkoxy groups. In the aromatic part aralkyl radicals correspond to the aforesaid definition and contain 1 to 4, preferably 1 or 2, carbon atoms in the aliphatic chain.

Aliphatic radicals ($R_1$, $R_2$) include both straight-chain and branched alkyl radicals with 1 to 12, preferably 1 to 4, carbon atoms, which are unsubstituted or which may be substituted by a lower alkoxy radical and which may further contain a double or a triple bond. Of course, aliphatic radicals may also be cycloaliphatic radicals with 3 to 12, preferably 5 to 7, in particular 6, carbon atoms in the ring system, which may be substituted by lower alkyl and/or alkoxy groups and which may contain a double bond. In case the alkyl radicals ($R_1$, $R_2$), together with the adjacent nitrogen atom, form part of a heterocycle, three to seven-membered, preferably five to six-membered, ring systems are included; in this case, the heterocyclic ring system may be anellated with a benzene nucleus and the heterocyclic ring system may contain oxygen, sulphur, or an N-alkyl (of 1 to 4 carbon atoms) radical, especially in the case of a six-membered ring. Flourine, chlorine and bromine are preferably used as the halogen atoms when $R_3$ is halogen.

$R_4$ may have the same meaning as $R_1$ and $R_2$. However, in order to achieve ready splitting, it is expedient and advantageous to use aliphatic or araliphatic radicals, especially lower alkyl radicals, which can easily be split off.

Exampless of anions of strong inorganic acids are $BF_4^-$, $HSO_4^-$, but preferably $Cl^-$, $Br^-$, and $I^-$.

When N-ethyl-3-chloro-1,2-benzisothiazolium chloride and diethylamine are used as starting material, then the reaction can be described by the following scheme of formulae:

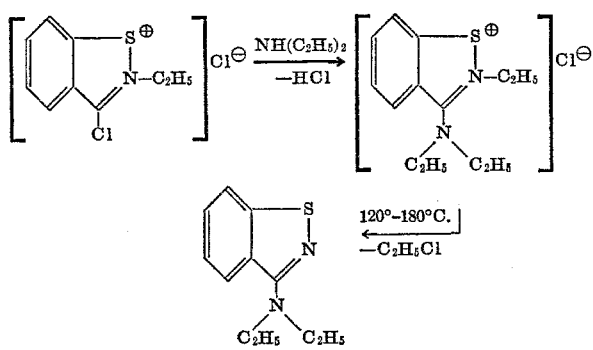

The starting compounds to be used in the process according to the invention can be obtained by reacting dithiosalicylic acid amides with a phosphorus pentahalide in an inert solvent at 80° C.

Suitable representatives are for example:

N-methyl-3-chloro-benzisothiazolium chloride (154° C. decomp.)
N-methyl-3-bromo-benzisothiazolium bromide (182° C. decomp.)
N-ethyl-3-chloro-benzisothiazolium chloride (194° C. decomp.)
N-propyl-3-chloro-benzisothiazolium chloride (171° C. decomp.)
N-isobutyl-3-chloro-benzisothiazolium chloride (162° C. decomp.)
N-butyl-3-chloro-benzisothiazolium chloride (162° C. decomp.)
N-($\beta$-chloroethyl)-3-chloro-benzisothiazolium chloride (174° C. decomp.)
N-cyclohexyl-3-chloro-benzisothiazolium chloride (108° C. decomp.)
N-phenyl-3-chloro-benzisothiazolium chloride (201° C. decomp.).

Examples of amines which are suitable in the herein described process are: methyl-propyl-amine, methyl-n-butyl-amine, ethyl-n-butyl-amine, methyl-allyl-amine, methyl-cyclohexyl-amine, methyl-cyclopentyl-amine, ethyl-cyclopentyl-amine.

The process of the invention is carried out, for example, by suspending 1 mol of N-alkyl-3-chloro-1,2-benzisothiazolium chloride, preferably N-ethyl-3-chloro-1,2-benzisothiazolium chloride, in 1.25 liters of an inert, high-boiling solvent, preferably 1,2-dichlorobenzene, and slowly introducing dropwise 2.5 moles of a secondary amine in the course of 1.5–2 hours. The internal temperature rises to 45–50° C. during the amine introduction. The reaction is completed by further stirring the reaction mixture for another 30 minutes. A small excess of amine should be present. The reaction mixture is subsequently heated to boiling. The splitting off of alkyl chloride at ~120° C. and is completed after about 30 minutes. The solvent is then distilled off in a vacuum and the reaction product isolated from the remaining semi-solid slurry in a suitable manner. The yields range from 40–60% of theory.

The new compounds are pale yellowish oils or low-melting crystalline substances. They are weak bases and form well crystallizing salts with strong acids. They are intended to be used as pharmaceutical agents, particularly as antimycotics in human and veterinary medicine, in a carrier or vehicle.

The new compounds possess a very good broad range of activity against pathogenic fungi; for example 3-piperidino-1,2-benzisothiazole shows the following spectrum of action:

$\gamma$ Active compound/ml. of nutrient solution

Trichophyton mentagr. ___ 4
Microsporium felin. ___ 10
Candida albicans ___ 10
Aspergillus niger ___ 20
Penicillium com. ___ 20

The inhibitory values of the other compounds obtainable by the herein described process are in the same order of magnitude.

The new compounds, especially 3-piperidino-1,2-benzisothiazole, exhibit upon dermal application in a 1% tincture (e.g. DMSO:glycerine/1:4) or a paste, a distinct effect in the experimental guinea pig trichophytosis. The new compounds are applied in form of their free bases or suitable salts, e.g. hydrochlorides, nitrates, and 1,5-naphthalene disulfonates. They can as well be similarly applied in human medicine.

Moreover, the compounds of the invention produce an effective blood level and are separated from the animal organism (urine) in active form.

The invention is further illustrated by the following example, without being restricted thereto.

EXAMPLE 3-diethylamino-1,2-benzisothiazole 46.8 g. (0.2 mol) of N-ethyl-3-chloro-1,2-benzisothiazolium chloride (finely powdered) are suspended in 250 ml. of 1,2-dichloro-benzene followed by the dropwise addition of 36.5 g. (0.5 mol) of diethylamino in the course of 1.5 to 2 hours, while stirring vigorously. The internal temperature rises to 45–50° C. The N-ethyl-3-chloro-1,2-benzisothiazolium chloride used progressively dissolves and at the same time diethylamino hydrochloride begins to crystallize out. The reaction mixture is subsequently heated to boiling. The splitting off of ethyl chloride sets in at ~120° C. with evolution of foam and is complete after about 30 minutes. A clear solution is formed. It is then somewhat cooled and the solvent drawn off in a water jet vacuum. The residual semi-solid mass is largely dissolved in 500 ml. of water and the mixture exhaustively extracted with ether. The oil which remains after drying and evaporation of the ether is fractionated in a high vacuum. There are obtained 24.8 g., i.e. 60% of theory, of a pale yellow oil of B.P. 110° C./0.3 mm. Hg; $n_D^{20}=1.6071$.

The same result is obtained when using, instead of the benzisothiazolium chloride, the benzisothiazolium bromide, or, instead of the N-alkyl compound, the cyclohexyl- or benzyl-compound.

The following compounds were prepared in principally the same way:

3-dimethylamino-1,2-benzisothiazole: yellowish oil; yield: 42% of theory; B.P. 76° C./0.01 mm. Hg; $n_D^{20}=1.6326$,
3-dipropylamino-1,2-benzisothiazole: yellow oil; yield: 53.5% of theory; B.P. 108° C./0.01 mm. Hg; $n_D^{20}=1.5852$,
3-methyl-ethylamino-1,2-benzisothiazole: yellowish oil; yield: 56% of theory; B.P. 67–73° C./0.01 mm. Hg; $n_D^{20}=1.6240$,
3-ethyl-benzylamino-1,2-benzisothiazole: pale yellow oil; yield: 45% of theory; B.P. 165° C./0.01 mm. Hg; perchlorate: M.P. 156° C.,
3-morpholino-1,2-benzisothiazole: yellowish oil: yield: 40% of theory; B.P. 105° C./0.01 mm. Hg; $n_D^{20}=1.6297$; M.P. 65° C. (from methanol),
3-piperidino-1,2-benzisothiazole: yellowish oil; yield: 40% of thoery; B.P. 140–142° C./0.5 mm. Hg; $n_D^{20}=1.6205$, 3-ethyl-cyclohexylamino-1,2-benzisothiazole: pale yellow oil; yield: 43% of theory; B.P. 151° C./ 0.3 mm. Hg; $n_D^{20} = 1.5998$, 3-diisobutylamino-1,2-benzisothiazole: pale yellow oil; yield: 30% of theory; B.P. 108–110° C./0.01 mm. Hg; $n_D^{20} = 1.5707$, 3-di-(2'-ethylhexyl)-amino-1,2-benzisothiazole: pale yellow oil; yield: 63% of theory; B.P. 124–128° C./0.01 mm. Hg, 3-dibutylamino-1,2-benzisothiazole: pale yellow oil; yield: 32% of theory; B.P. 128° C./0.01 mm. Hg; $n_D^{20} = 1.5681$, 3-hexamethylenimino-1,2-benzisothiazole: yellow oil; yield: 18% of theory; B.P. 165° C./0.01 mm. Hg, 3-diallylamino-1,2-benzisothiazole: pale yellow oil; yield: 26% of theory; B.P. 125° C./0.01 mm. Hg.

The N-ethyl-3-chloro-1,2-benzisothiazolium chloride used as starting compound in Example 1 was prepared as follows:

36.0 g. (0.1 mol) of N-ethyl-dithiosalicylic acid amide are suspended in 200 ml. of absolute benzene and 62.4 g. (0.3 mol) of phosphorus pentachloride are added. The mixture is subsequently heated to 80° C. with stirring. A clear solution is initially formed with the evolution of HCl. After about 15 minutes the reaction product begins to precipitate. Precipitation is completed by heating for a further 15 minutes. The reaction mixture is then cooled, filtered off with suction, washed and dried. 21 g. (45% of theory) of a crude product are obtained. After re-crystallization from o-dichlorobenzene, the compound yields colorless, coarse prisms of melting point 194° C. (decomposition).

The other starting compounds to be used in the process of the invention can be obtained in analogous manner.

What is claimed is:

1. An antimycotic composition comprising, in combination with a pharmaceutical carrier, an antimycotically effective amount of a compound of the formula:

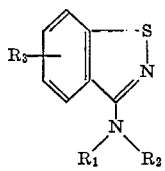

wherein $R_1$ and $R_2$ when taken independently of each other are each phenyl, benzyl, alkyl of 1 to 12 carbon atoms, allyl or cycloalkyl of 5 to 7 carbon atoms and when taken together with the nitrogen atom to which they are attached, morpholino, piperidino or hexamethyleneimino;

$R_3$ is hydrogen, chloro, fluoro, bromo, alkyl of 1 to 4 carbon atoms, alkoxy of 1 to 4 carbon atoms or nitro, or a pharmaceutically acceptable acid addition salt thereof with a strong inorganic acid.

2. The composition according to claim 1 wherein $R_1$ and $R_2$ are each ethyl.

3. The composition according to claim 1 wherein $R_1$ and $R_2$ are each methyl.

4. The composition according to claim 1 wherein $R_1$ and $R_2$ are each isopropyl.

5. The composition according to claim 1 wherein $R_1$ and $R_2$ are each isobutyl.

6. The composition according to claim 1 wherein $R_1$ and $R_2$ are each butyl.

7. The composition according to claim 1 wherein $R_1$ and $R_2$ are each 2-ethylhexyl.

8. The composition according to claim 1 wherein $R_1$ and $R_2$ are each allyl.

9. The composition according to claim 1 wherein $R_1$ is methyl and $R_2$ is ethyl.

10. The composition according to claim 1 wherein $R_1$ is ethyl and $R_2$ is benzyl.

11. The composition according to claim 1 wherein $R_1$ is ethyl and $R_2$ is cyclohexyl.

12. The composition according to claim 1 wherein $R_1$ and $R_2$ together are morpholino.

13. The composition according to claim 1 wherein $R_1$ and $R_2$ together are piperidino.

14. The composition according to claim 1 wherein $R_1$ and $R_2$ together are hexamethyleneimino.

15. A method of combatting mycotic infections in an animal in need thereof which comprises topically applying thereto an antimycotically effective amount of a compound of the formula:

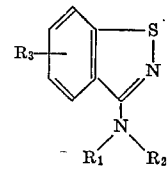

wherein $R_1$ and $R_2$ when taken independently of each other are each phenyl, benzyl, alkyl of 1 to 12 carbon atoms, allyl or cycloalkyl of 5 to 7 carbon atoms and when taken together with the nitrogen atom to which they are attached, morpholino, piperidino or hexamethyleneimino;

$R_3$ is hydrogen, chloro, fluoro or bromo, alkyl of 1 to 4 carbon atoms, alkoxy of 1 to 4 carbon atoms or nitro, or a pharmaceutically acceptable acid addition salt thereof with a strong inorganic acid.

References Cited
UNITED STATES PATENTS

| | | | |
|---|---|---|---|
| 3,655,686 | 4/1972 | Becke et al. | 424—270 |
| 3,528,989 | 9/1970 | Skorcz et al. | 424—270 |
| 3,627,776 | 12/1971 | Bosmagen et al. | 424—270 |

ALBERT T. MEYERS, Primary Examiner

V. D. TURNER, Assistant Examiner

U.S. Cl. X.R.

260—247.1, 293.56, 304, 306.8; 424—248, 267, 270

PO-1050
(5/69)

UNITED STATES PATENT OFFICE
CERTIFICATE OF CORRECTION

Patent No. 3,787,572   Dated January 22, 1974

Inventor(s) Horst Boshagen

It is certified that error appears in the above-identified patent and that said Letters Patent are hereby corrected as shown below:

In the heading of the patent, change the filing date of the German application F 53242 to -- August 16, 1967 --.

Signed and sealed this 2nd day of July 1974.

(SEAL)
Attest:

EDWARD M. FLETCHER, JR.
Attesting Officer

C. MARSHALL DANN
Commissioner of Patents